(12) United States Patent
Sishtla et al.

(10) Patent No.: US 8,742,951 B1
(45) Date of Patent: Jun. 3, 2014

(54) SYSTEM AND METHOD FOR INDICATING WINDSHEAR SYSTEM READINESS

(75) Inventors: Venkata A. Sishtla, Marion, IA (US);
Terrence P. Wey, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 400 days.

(21) Appl. No.: 13/174,202

(22) Filed: Jun. 30, 2011

(51) Int. Cl.
*G08B 23/00* (2006.01)

(52) U.S. Cl.
USPC ............................ 340/968; 340/945; 340/963

(58) Field of Classification Search
USPC ....................................................... 340/968
See application file for complete search history.

(56) References Cited

U.S. PATENT DOCUMENTS

| | | | | |
|---|---|---|---|---|
| 6,636,786 B2 * | 10/2003 | Partel | ................................. | 701/3 |
| 7,557,735 B1 * | 7/2009 | Woodell et al. | ............... | 340/968 |
| 2003/0078704 A1 * | 4/2003 | Partel | ................................. | 701/3 |
| 2004/0119603 A1 * | 6/2004 | Bohlander et al. | ........ | 340/815.45 |
| 2005/0125117 A1 * | 6/2005 | Breed | ............................. | 701/29 |

OTHER PUBLICATIONS

RTCA DO-220, Minimum Operational Performance Standards for Airborne Weather Radar with Forward-Looking Windshear Capability, Foreword, Table of Contents, Purpose and Scope, Sep. 21, 1993, 17 pages.

\* cited by examiner

*Primary Examiner* — Travis Hunnings
(74) *Attorney, Agent, or Firm* — Donna P. Suchy; Daniel M. Barbieri

(57) ABSTRACT

A method for indicating readiness of a predictive windshear system on an aircraft is provided. The method includes determining whether a windshear system is in a ready state and providing a first output that causes an indication of the ready state, the ready state being responsive to the windshear system being ready to detect a windshear event. Determining whether the windshear system is in the ready state includes comparing a first time until a first parameter reaches a first value with a second time for initialization of the windshear system and determining that the windshear system is ready to detect the windshear event in response to the first time being greater than the second time.

20 Claims, 7 Drawing Sheets

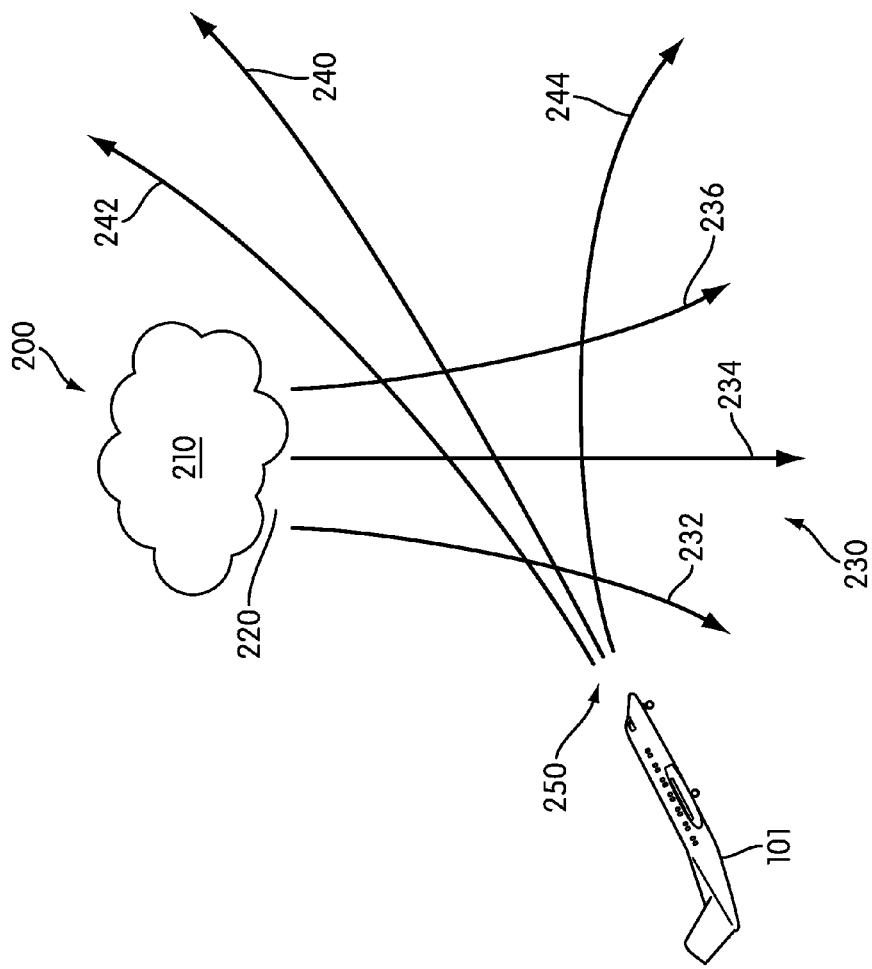
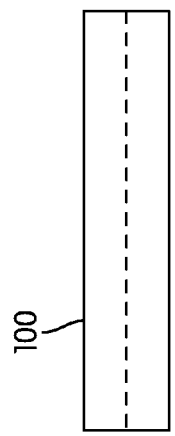
FIG. 2

SYSTEM AND METHOD FOR INDICATING WINDSHEAR SYSTEM READINESS

BACKGROUND

The present disclosure relates generally to the field of aircraft radar systems. The present disclosure more specifically relates to the field of predictive windshear radar systems.

Currently, windshear detection radars require time to detect and report a windshear hazard. This time can range from 10-15 seconds depending on various factors such as antenna position. For large aircraft, this initialization time is less than the time required to accelerate to a go/no-go or inhibit speed during takeoff. Thus, takeoffs in large aircraft are protected by the windshear detection system. However, smaller business and regional services aircraft may accelerate to a go/no-go or inhibit speed during takeoff in less than the initialization time of the windshear detection system. Applicants have discovered that there may be a need to alert the crew regarding the likely readiness of the windshear system to help avoid the possibility for an unprotected takeoff.

SUMMARY

One embodiment of the present disclosure relates to a method for indicating readiness of a predictive windshear system on an aircraft. The method includes determining whether a windshear system is in a ready state and providing a first output that causes an indication of the ready state, the ready state being responsive to the windshear system being ready to detect a windshear event. Determining whether the windshear system is in the ready state includes comparing a first time until a first parameter reaches a first value with a second time for initialization of the windshear system and determining that the windshear system is ready to detect the windshear event in response to the first time being greater than the second time.

Another embodiment of the present disclosure relates to an apparatus for indicating readiness of a predictive windshear system on an aircraft. The apparatus includes processing electronics configured to determine whether a windshear system is ready to detect a windshear event. The processing electronics cause an indication of readiness to be output in response to a determination that the windshear system is ready to detect the windshear event. The processing electronics may be configured to compare a predicted time until a first value with a predicted time until initialization of the windshear system and to determine that the windshear system is ready to detect a windshear event in response to the predicted time until the first value being greater than the predicted time until initialization.

Another embodiment of the present disclosure relates to a system for indicating readiness of a predictive windshear system on an aircraft. The system includes means for determining whether a windshear system is ready to detect a windshear event and means for providing a first output that causes an indication of readiness in response to a determination that the windshear system is ready to detect the windshear event. The system may further include means for comparing a predicted time until a first value with a predicted time until initialization of the windshear system and means for determining that the windshear system is ready to detect the windshear event in response to the predicted time until the first value being greater than the predicted time until initialization.

BRIEF DESCRIPTION OF THE DRAWINGS

FIG. 2 is a schematic illustration of an aircraft encountering a windshear event during takeoff.

DETAILED DESCRIPTION

Figure 1:
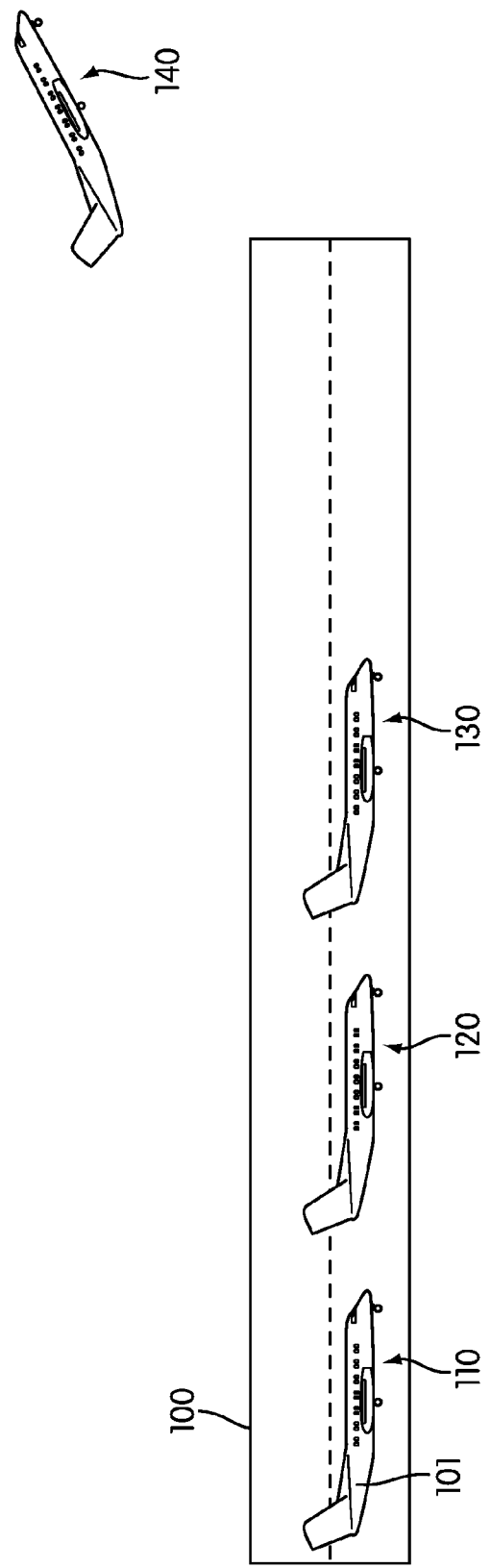
FIG. 1 is a schematic illustration of an aircraft taking off from a runway in accordance with an exemplary embodiment.

Referring generally to the Figures, systems and methods for indicating readiness of the windshear system on an aircraft are described. Storm systems may create rain accompanied by microbursts. Such microbursts may cause a windshear, which presents a danger to aircraft primarily during takeoff and landing. Windshear systems on aircraft may detect these microbursts; however, windshear detection radars require time to detect and report a windshear hazard. This time can be anywhere between 10 and 15 seconds depending on various factors like ground speed, longitudinal acceleration, throttle lever angle, antenna position, etc. Currently, 100 knots may be used as an inhibit speed (no new alerts will be annunciated once the aircraft hits 100 knots until it reaches 50 feet above ground level). A very lightly loaded large air transport aircraft (e.g., a Boeing 777 aircraft) may take approximately 18 seconds to reach 100 knots from brake release. Accordingly, in larger aircraft, conventional takeoffs are within the time to collect and process windshear radar echo information and for the windshear detection system to be initialized and ready to detect hazards. Thus, in larger aircraft, the time to report is kept within the takeoff abort region.

When the predictive windshear radar platform is installed in smaller business and regional service (BRS) aircraft (e.g., a Bombardier Global Express aircraft), the takeoff abort region is greatly reduced in time such that the aircraft may be committed to take off prior to the ability of the predictive windshear radar to report windshear hazards, thus allowing the possibility for unprotected takeoff. For example V1 speed (e.g., the maximum speed at which a pilot must take a first action (e.g., apply brakes, reduce thrust, deploy speed brakes) to stop the aircraft within an accelerate-stop distance) for a BRS aircraft can be as low as 98 knots and given the higher acceleration rates of BRS aircraft, there may not be enough time for a predictive windshear radar to be initialized and ready to detect hazards. Therefore, there is a need to alert the crew regarding the readiness of predictive windshear system (PWS) coverage especially in applications for non-transport aircraft such as BRS aircraft.

To indicate to a pilot whether takeoff will be covered by the windshear radar, processing electronics are configured to determine whether a windshear system is ready to detect a windshear event. In response to a determination that the windshear system is ready to detect a windshear event, the processing electronics cause an indication of ready states to be output. According to one embodiment, the processing electronics are configured to compare a predicted time to a first value (e.g., V1, 100 knots, 50 feet above ground level, etc.) with a predicted time to initialization of the windshear system, and the processing electronics are configured to determine that the windshear system is ready to detect a windshear event in response to the predicted time to the first value being greater than the predicted time to initialization. The indication may notify the pilot in a variety of manners, for example, causing an icon to appear on a display, causing the display or portion of the display to flash, illuminating a lamp, or producing a sound, such as an aural, flight deck alert annunciation. Indicating the readiness of the windshear system may help avoid the possibility of an unprotected takeoff. Further, indicating the readiness of the windshear system may enable a pilot to begin takeoff prior to complete initialization of the windshear system, e.g., instead of waiting at the end of the runway for the windshear system to initialize. Beginning takeoff prior to complete initialization may save up to 15 seconds of aircraft time on runway per takeoff, which may help reduce congestion at busy airports.

Referring to FIG. 1, aircraft 101 is shown taking off from runway 100. Aircraft 101 begins takeoff from position 110. Aircraft 101 may begin takeoff from a fully stopped position. Alternatively, aircraft 101 may begin takeoff from a rolling start, carrying momentum as it enters runway 100 from a taxiway. As aircraft 101 accelerates, a parameter of the aircraft attains a first value. According to one embodiment, the parameter is a speed and the first value is a speed at which the pilot satisfies all safety rules and above which the takeoff will continue even if an engine fails, variously referred to as V1, "go" speed, the point of no return, takeoff decision speed, or critical engine failure recognition speed. If the pilot has not aborted takeoff by V1, aircraft 101 will continue to accelerate to a second speed, V2, at which aircraft 101 may safely become airborne, shown as position 140. According to another embodiment, the first value may be a predetermined inhibit speed (e.g., 100 knots) after which no new alerts will be annunciated until the aircraft has taken off. According to yet another embodiment, the parameter is an altitude and the first value may be, for example, 50 feet above ground level.

The time necessary for aircraft 101 to attain V1 or an inhibit speed varies based on a variety of factors. A heavily loaded large aircraft will take longer to accelerate than a lightly loaded business and regional service (BRS) sized aircraft. For example, even a lightly loaded large air transport aircraft accelerates from brake release to V1 in approximately 18 seconds, shown as position 130. In contrast, a BRS aircraft may become airborne in 18 seconds, having attained V1 in under 15 seconds as indicated by position 120. Other factors that may affect the time to reach V1 or an inhibit speed include aircraft type, acceleration, thrust current ground speed, V speeds, current state meteorological conditions (e.g., wind speed and direction), barometric pressure, and throttle position. Runway length may also affect the calculation of V1.

While FIG. 1 is shown in a physical domain, it may be understood in a time domain, shown to increase from left to right. According to one embodiment, position 110 represents a time, t0, at which aircraft 101 begins takeoff. According to another embodiment, t0 may represent the time at which the windshear system begins initializing. According to yet another embodiment, position 110 may represent a time, t1, at which the windshear system has already begun initialization but aircraft 101 has not yet attained a first speed. Position 120 may represent the time, t2, necessary for a smaller, BRS aircraft to accelerate to the first speed. Position 130 may represent the time, t3, necessary for a larger or heavily loaded aircraft to accelerate to the first speed. Position 140 may represent a time, t4, at which aircraft 101 is airborne.

Referring to FIG. 2, a windshear event 200 is depicted. A storm system 210 may create rain 220 accompanied by microbursts 230. Such microbursts pose the greatest danger to aircraft during takeoff and landing, when the plane is close to the ground and has little time or room to maneuver. During takeoff, aircraft 101 is near stall speed and thus very vulnerable to windshear. Aircraft 101 may be proceeding, for example, along a climb trajectory 240. At a point 250, aircraft 101 enters the windshear region. In such a windshear region, aircraft 101 first encounters a headwind 232 followed by a downdraft 234 and then followed by a tailwind 236. Headwind 232 causes a sudden leap in airspeed, and aircraft 101 lifts. If the pilots are unaware that this speed increase is caused by windshear, they are likely to react by reducing engine power. However, as aircraft 101 passes through the windshear, the wind quickly becomes downdraft 234 and then tailwind 236. This reduces the speed of air over the wings, and the extra lift and speed vanish. Because the plane is flying near stall speed and now on reduced power, it is vulnerable to sudden loss of airspeed and altitude. Pilots may be able to escape microburst 230 by adding power to the engines. For example, if the pilot of aircraft 101 is alerted to the dangerous windshear conditions in a timely manner, the pilot of aircraft 101 will be able to make a windshear avoidance maneuver along the path 242. However, if the windshear is not detected in a timely manner, aircraft 101 may attempt to recover along a path 244 which may result in an unintended landing. Accordingly, it is important that a windshear system provides the pilot with enough time to make a decision to attempt to avoid the windshear hazards.

There are two kinds of systems which are used to alert pilots to windshear: reactive and predictive systems. Reactive windshear systems use aircraft 101's in situ instrumentation to estimate the rate of change in the horizontal winds, measure downdraft strength, and measure aircraft speed. Predictive systems measure the airflow in front of aircraft 101. Radar is one method of making those measurements. Microwave radar sends a microwave radar signal ahead of aircraft 101 to seek raindrops and other moisture particles. The returning signal represents the motion of those raindrops and moisture particles, and this is translated into wind speed.

Figure 3:
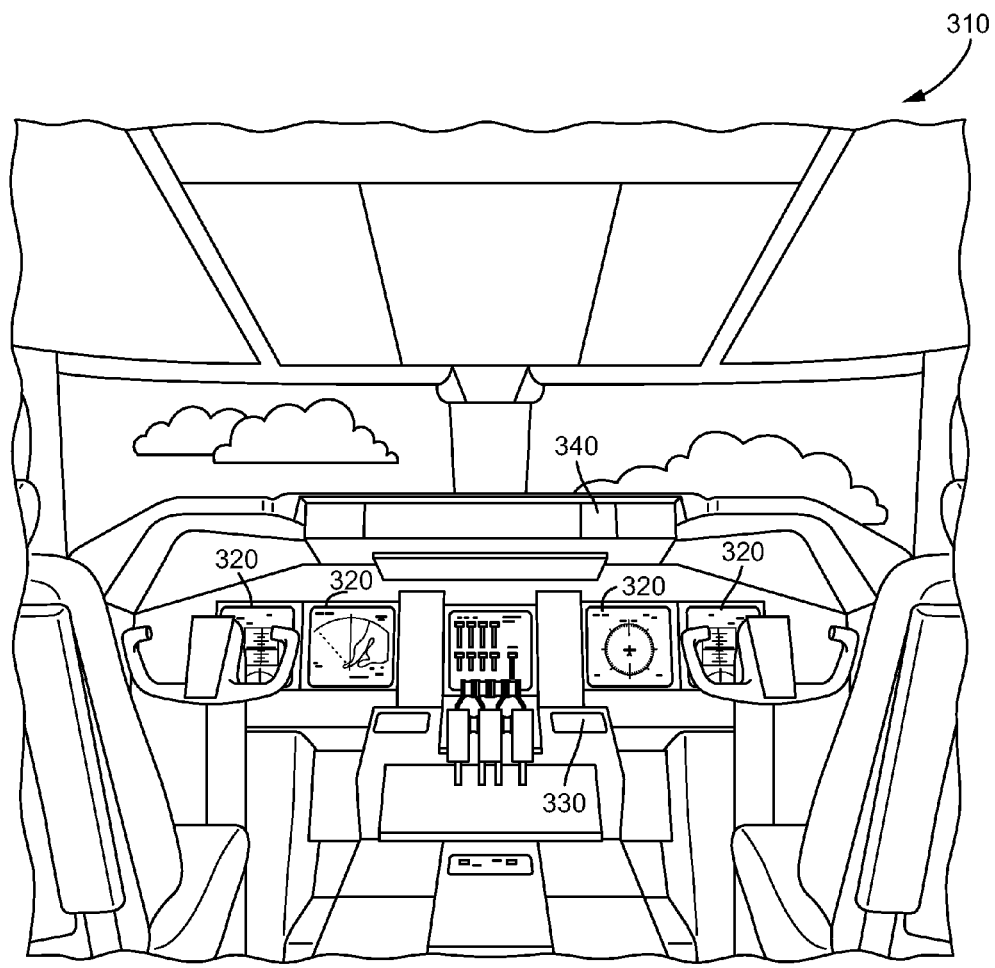
FIG. 3 is a perspective view schematic illustration of an aircraft control center, according to an exemplary embodiment.

Referring to FIG. 3, an illustration of an aircraft control center or cockpit 310 is shown, according to an exemplary embodiment. Aircraft control center 310 includes flight displays 320 which are generally used to increase visual range and to enhance decision-making abilities. Flight displays 320 may provide an output from a radar system of the aircraft. For example, flight displays 320 may provide a top-down view, a horizontal view, or any other view of weather and/or terrain detected by a radar system on the aircraft. The views of weather and/or terrain may include monochrome or color graphical representations of the weather and/or the terrain. Graphical representations of weather or terrain may include an indication of altitude of those objects or the altitude relative to the aircraft.

Aircraft control center 310 may further include predictive windshear system (PWS) user interface elements (illuminating or flashing lamps 340, displays 320, display elements on a weather radar display, display elements on a terrain display, audio devices 330, etc.) configured to warn the pilot of potentially threatening microbursts. The PWS may be configured to, for example, give the pilots of the aircraft a "windshear detected" or "windshear ahead" indication (e.g., audibly, visually, etc.) when windshear is detected within the path of the aircraft.

Figure 4:
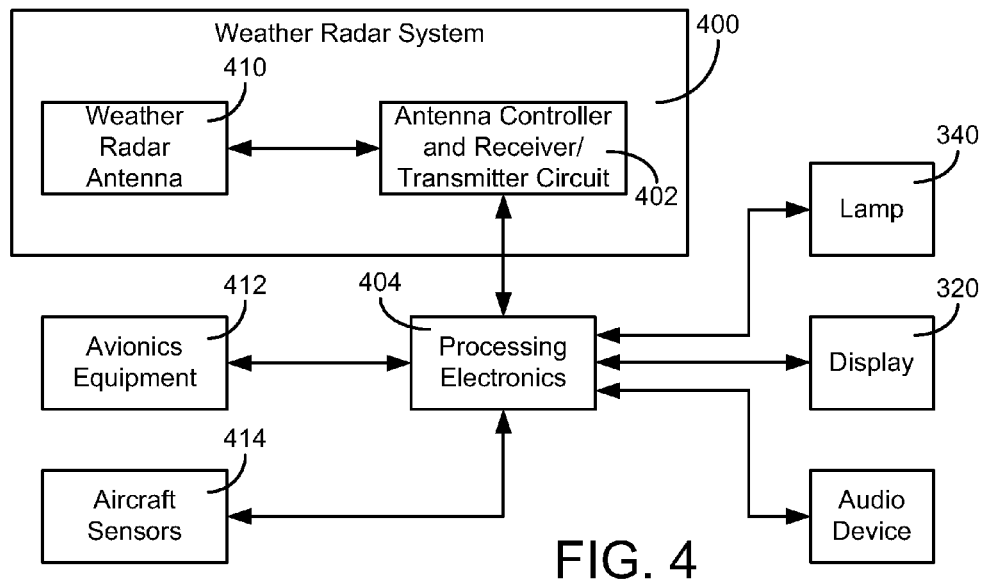
FIG. 4 is a general schematic block diagram of a weather radar system, according to an exemplary embodiment.

Referring to FIG. 4, a block diagram of weather radar system 400 is shown according to an exemplary embodiment. Radar system 400 (e.g., a weather radar system, predictive windshear radar, or other radar system) is generally located within the nose of aircraft 101 or within aircraft control center 310 of aircraft 101. According to various exemplary embodiments, radar system 400 may be located on the top of aircraft 101 or on the tail of aircraft 101. Radar system 400 may include or be coupled to an antenna system. Any suitable antenna or radar system may be used with the present invention. According to one embodiment, radar system 400 uses an antenna between approximately 12 inches and 24 inches.

Weather radar system 400 is shown to include a weather radar antenna 410 connected (e.g., directly, indirectly) to an antenna controller and receiver/transmitter circuit 402. Antenna controller and receiver/transmitter circuit 402 may include any number of mechanical or electrical circuitry components or modules for steering a radar beam. For example, circuit 402 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 402 may be configured to conduct the actual signal generation that results in a radar beam being provided from weather radar antenna 410 and to conduct the reception of returns received at radar antenna 410. Radar return data is provided from circuit 402 to processing electronics 404 for processing. For example, processing electronics 404 can be configured to interpret the returns for display on display 320. Processing electronics 404 can also be configured to output indications, notifications, alerts, warnings, etc., to audio device 330 and/or lamp 340.

Processing electronics 404 can also be configured to provide control signals or control logic to circuit 402. For example, depending on pilot or situational inputs, processing electronics 404 may be configured to cause circuit 402 to change behavior or radar beam patterns. In other words, processing electronics 404 may include the processing logic for operating weather radar system 400.

Processing electronics 404 are further shown as connected to aircraft sensors 414 which may generally include any number of sensors configured to provide data to processing electronics 404. For example, sensors 414 could include temperature sensors, humidity sensors, infrared sensors, altitude sensors, pressure sensors, airspeed sensors, ground speed sensors, pitot-static tubes, a gyroscope, a global positioning system (GPS), or any other aircraft-mounted sensors that may be used to provide data to processing electronics 404. It should be appreciated that sensors 414 (or any other component shown connected to processing electronics 404) may be indirectly or directly connected to the processing electronics 404. Processing electronics are further shown as connected to avionics equipment 412. Avionics equipment 412 may be or include a flight management system, a navigation system, a backup navigation system, or another aircraft system configured to provide inputs to processing electronics 404. For example, avionics equipment 412 may provide controls inputs, such as throttle or power level.

Figure 5:
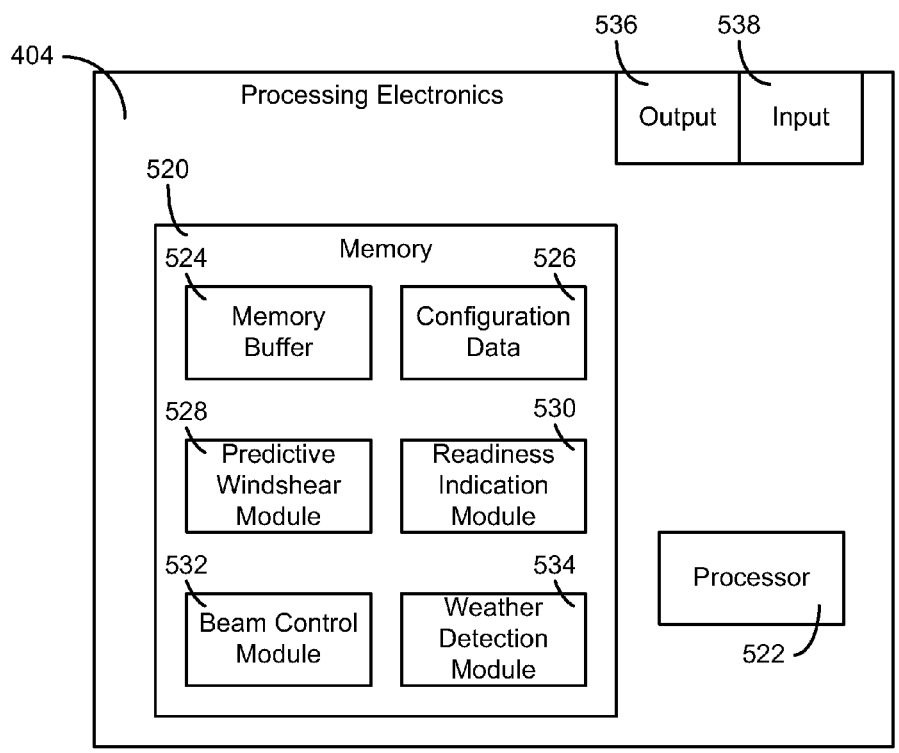
FIG. 5 is a general schematic block diagram of the processing electronics of the weather radar system of FIGS. 4 and 6, according to an exemplary embodiment.

Referring to FIG. 5, a detailed block diagram of processing electronics 404 of FIG. 4 is shown, according to an exemplary embodiment. Processing electronics 404 includes a memory 520 and processor 522. Processor 522 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 522 is configured to execute computer code stored in memory 520 to complete and facilitate the activities described herein. Memory 520 can be any volatile or non-volatile memory device capable of storing data or computer code relating to the activities described herein. For example, memory 520 is shown to include modules 528-534 which are computer code modules (e.g., executable code, object code, source code, script code, machine code, etc.) configured for execution by processor 522. When executed by processor 522, processing electronics 404 is configured to complete the activities described herein. Processing electronics includes hardware circuitry for supporting the execution of the computer code of modules 528-534. For example, processing electronics 404 includes hardware interfaces (e.g., output 536) for communicating control signals (e.g., analog, digital) from processing electronics 404 to circuit 402. Processing electronics 404 may also include an input 538 for receiving, for example, radar return data from circuit 402, feedback signals from circuit 402 or for receiving data or signals from other systems or devices.

Memory 520 includes a memory buffer 524 for receiving radar return data. The radar return data may be stored in memory buffer 524 until buffer 524 is accessed for data. For example, a forward looking terrain alerting algorithm, an object detection module, a predictive windshear module 528, a readiness indication module 530, a weather detection module 534, or another process that utilizes radar return data may access buffer 524. The radar return data stored in memory 520 may be stored according to a variety of schemes or formats. For example, the radar return data may be stored in an x,y or x,y,z format, a heading-up format, a north-up format, a latitude-longitude format, or any other suitable format for storing spatial-relative information.

Memory 520 further includes configuration data 526. Configuration data 526 includes data relating to weather radar system 400. For example, configuration data 526 may include beam pattern data which may be data that beam control module 532 can interpret to determine how to command circuit 402 to sweep a radar beam. For example, configuration data 526 may include information regarding maximum and minimum azimuth angles of horizontal radar beam sweeps, azimuth angles at which to conduct vertical radar beam sweeps, timing information, speed of movement information, and the like.

Memory 520 further includes a predictive windshear module 528 which includes logic for using radar returns in memory buffer 524 to detect the presence or absence of microbursts or windshear. Predictive windshear module 528 may be a part of a PWS or be utilized by a PWS (e.g., microburst or windshear determinations are provided from module 528 to a PWS device or module). Predictive windshear module 528 may include or be coupled to a weather database or other memory including weather data, for example microburst down-flow models. Predictive windshear module 528 may be configured to use radar return information or information derived by radar return information with weather data stored in a weather database or other memory.

Memory 520 further includes a readiness indication module 530, which may include logic for calculating a first time until a first parameter reaches a first value. According to various embodiments, readiness indication module 530 may include logic for calculating a predicted time for aircraft 101 to attain a speed of V1, a predicted time for aircraft 101 to attain an inhibit speed, or a predicted time for aircraft 101 to attain a predetermined altitude. Readiness indication module 530 which may include logic for calculating a second time for initialization of the windshear system or a predicted time until initialization of the PWS. Alternatively, readiness indication module 530 may be configured to receive the first time or a predicted time from another module or from avionics equipment 412. Readiness indication module 530 may be configured to receive the second time or a predicted time until initialization from another module, for example predictive windshear module 528 or beam control module 532. Readiness indication module 530 may include logic for determining whether a windshear system is ready to detect a windshear event. According to one embodiment, readiness indication module 530 may be configured to provide an output (e.g., first output, second output, etc.) that causes an indication of readiness in response to a determination that windshear system is ready to detect the windshear event. According to another embodiment, readiness indication module 530 may be configured to provide an output (e.g., first output, second output, etc.) that causes an indication of a ready state, the ready state being responsive to the windshear system being ready to detect the windshear event. According to alternate embodiments, readiness indication module 530 may be configured to determine whether a windshear system is likely ready to detect a windshear event, or to indicate a ready state in response to the windshear system being likely ready to detect a windshear event.

Memory 520 is further shown to include weather detection module 534 which includes logic for using radar returns in memory buffer 524 to conduct one or more determinations relating to weather. For example, weather detection module 534 may be configured to determine a gain level or other display setting for display of the radar returns on a weather radar display. Weather detection module 534 may further be configured to distinguish terrain returns from weather returns. Weather detection module 534 may be configured to determine when weather is hazardous, determine characteristics of weather, or to conduct any other processing steps (e.g., filtering) relative to radar return data used for weather display or warning in the aircraft.

Memory 520 is further shown to include beam control module 532. Beam control module 532 may be an algorithm for commanding circuit 402 to sweep a radar beam. Beam control module 532 may be used, for example, to send one or more analog or digital control signals to circuit 402. The control signals may be, for example, an instruction to move the antenna mechanically, an instruction to conduct an electronic beam sweep in a certain way, an instruction to move the radar beam to the left by five degrees, etc. Beam control module 532 may be configured to control timing of the beam sweeps or movements relative to aircraft speed, flight path information, transmission or reception characteristics from weather radar system 400 or otherwise. Beam control module 532 may receive data from configuration data 526 for configuring the movement of the radar beam.

Figure 6:
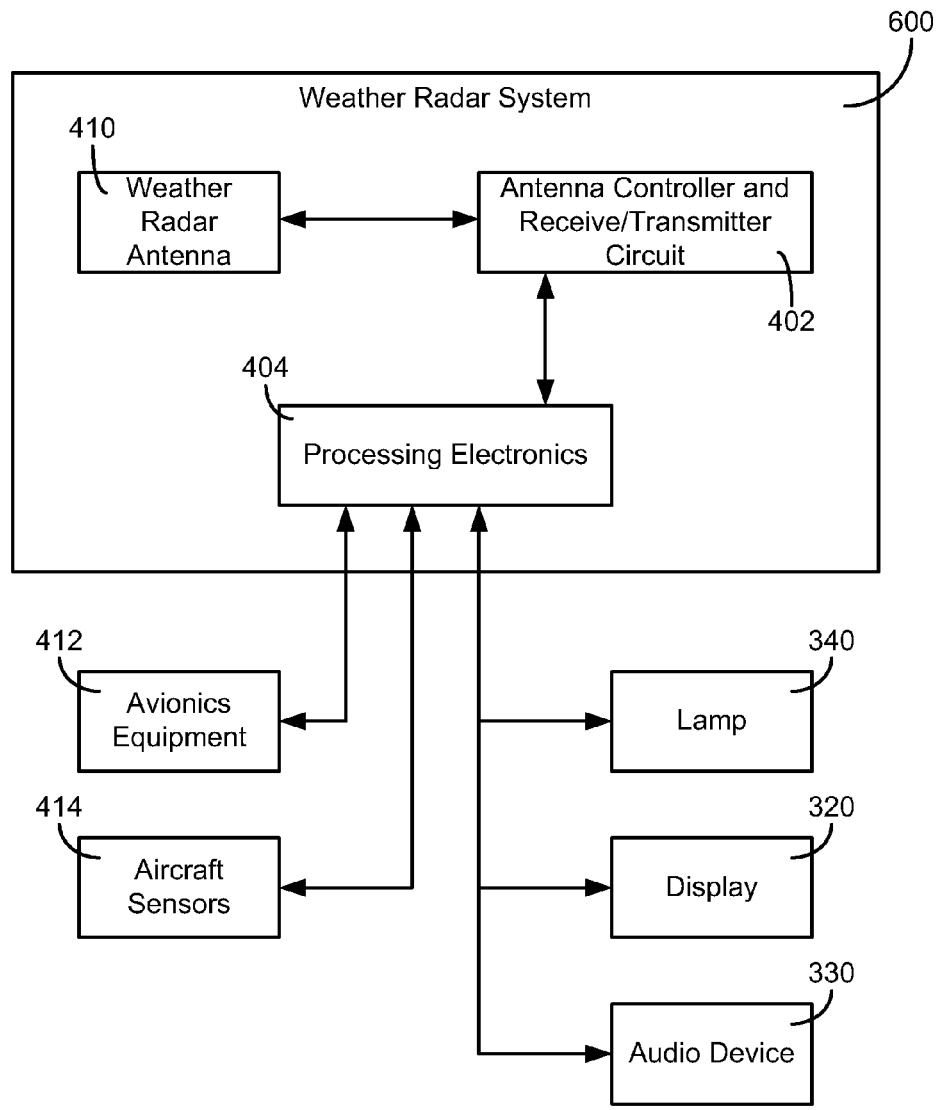
FIG. 6 is a general schematic block diagram of a weather radar system, according to another exemplary embodiment.

Referring to FIG. 6, a block diagram of weather radar system 600 (e.g., a weather radar system, predictive windshear radar, or other radar system) is shown according to an exemplary embodiment. Radar system 600 is shown to include a weather radar antenna 410 connected (e.g., directly, indirectly) to an antenna controller and receiver/transmitter circuit 402, and components thereof as described in radar system 400. Radar system 600 further includes processing electronics 404 and components thereof as described above. While located in radar system 600, processing electronics 404 may still be configured to communicate with avionics equipment 412, aircraft sensors 414, display 320, audio device 330, and lamp 340.

Radar system 600 is generally located within nose of aircraft 101 or within aircraft control center 310 of aircraft 101. According to various exemplary embodiments, radar system 600 may be located on the top of aircraft 101 or on the tail of aircraft 101. Radar system 600 may include or be coupled to an antenna system. Any suitable antenna or radar system may be used with the present invention. According to one embodiment, radar system 600 uses an antenna between approximately 12 inches and approximately 24 inches.

Figure 7:
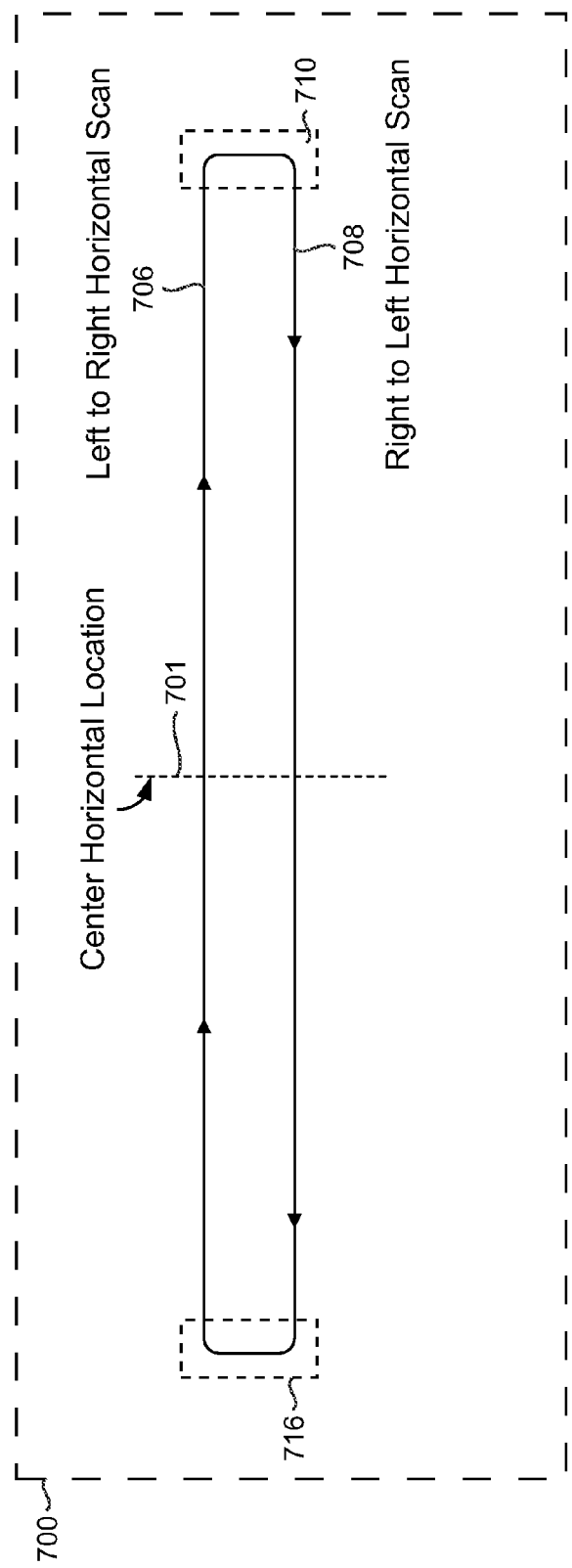
FIG. 7 is a schematic illustration of a radar beam sweep, according to an exemplary embodiment.

Referring to FIG. 7, an exemplary radar beam pattern generated by the systems and methods described herein is illustrated according to an exemplary embodiment. The radar beam patterns may be created by weather radar system 400 based on control activities provided by circuit 402 shown in FIGS. 4 and 6 and processing electronics 404 shown in FIGS. 4-6. For example, beam control module 532 may provide control signals to circuit 402 that command weather radar system 400 to provide certain radar beam movements that form the pattern illustrated in FIG. 7. Radar system 400 generally works by sweeping a radar beam horizontally back and forth across the sky.

The radar beam pattern shown in FIG. 7 is a graphical representation of how a radar beam projected forward into the page would be moved according to an exemplary embodiment. For example, when a line of FIG. 7 runs to the right side of the page, the line represents a horizontal radar movement (i.e., "sweep" or "scan") to the right; when the line runs downward relative to the page, the line represents a vertical downward scan by the radar beam. In some embodiments the nose of the aircraft would be pointing directly into and perpendicular to the page surface. Further, in FIG. 7, a center horizontal location 701 is marked. In embodiments where the nose of the aircraft points directly into and perpendicular to the page surface, the center horizontal location may be coextensive with the ground track of the aircraft when the aircraft is flying level or taking off. According to other exemplary embodiments (and/or dependent on aircraft movement), the center horizontal location may be a symmetrical center of a far left of a horizontal sweep and a far right of a horizontal sweep.

Sweep 700 includes a first scan, shown as left-to-right horizontal scan 706, and a second scan, shown as right-to-left horizontal scan 708. According to one embodiment, left-to-right horizontal scan 706 may be configured to collect data for weather processing and right-to-left horizontal scan 708 may be configured to collect windshear data (e.g., using the Doppler effect). According to another embodiment, scan 706 may be configured to collect windshear data while scan 708 may be configured to collect data for weather processing. Vertical tilt adjustments 716 may exist between left-to-right horizontal scan 706 and right-to-left horizontal scan 708. Vertical tilt adjustments 716 can define a left maximum azimuth angle and a right maximum azimuth angle between which horizontal sweeps 700 extend. According to an exemplary embodiment, left-to-right horizontal scan 706 takes approximately 3 seconds, and right-to-left horizontal scan 708 takes approximately 3 additional seconds. Accordingly, sweep 700 requires approximately 6 seconds to complete.

As mentioned above relative to FIGS. 4 and 5, radar returns received at the radar system in response to the beams projected from the radar system can be provided as radar return data to a memory buffer and processing electronics may be configured to process the radar return data. Returns can be processed, for example, to distinguish between terrain and weather, to determine the height of terrain, or to determine the height of weather. Some radar systems will conduct a first horizontal sweep 700 directly in front of the aircraft and a second horizontal sweep upward or downward at some tilt angle (e.g., 20 degrees). Returns from different tilt angles can be electronically merged to form a composite image for display on display 320.

Initializing a PWS requires two Doppler scans on target, i.e., the sky in its path, which may require more than 9 seconds. For example, once aircraft 101 has lined up on runway 100, weather radar antenna 410 performs a first right-to-left horizontal scan 708 (3 seconds), a left-to-right horizontal scan 706 (3 seconds), and a second right-to-left horizontal scan 708 (3 seconds) for a total of 9 seconds. However, initialization may take up to 15 seconds. For example, if radar antenna 410 is near center horizontal location 701 during a right-to-left horizontal scan 708, radar antenna 410 must complete the right-to-left horizontal scan 708 (1.5 seconds) and perform a left-to-right horizontal scan 706 (3 seconds) before performing the three scan sequence described above. The radar returns then must be processed for example by predictive windshear module 528.

To avoid irradiating ground crew, pilots often turn weather radar system 400 off near the gate, terminal, or ramp. While taxiing from a ramp to runway 100, many pilots leave radar system 400 off, in which case weather radar antenna 410 is parked in a position proximate center horizontal location 701, or place radar system 400 in a test mode, in which case weather radar antenna 410 sweeps but does not transmit a radar beam. Many pilots do not place radar system 400 into a transmit mode until they are lined up on runway 100 or have taken off. Accordingly, aircraft 101 may already be moving when the predicted time until V1 begins to be calculated, resulting in non-zero initial conditions (e.g., ground speed). To maximize PWS coverage of the takeoff, processing electronics 404 may cause radar system 400 to begin transmitting and/or scanning when certain conditions or qualifiers are met. According to one embodiment, radar system 400 begins transmitting in a windshear or Doppler mode when certain qualifiers are met. According to various embodiments, the conditions or qualifiers may include radar system 400 not transmitting, exceeding a predetermined ground speed (e.g., 30 knots), exceeding a predetermined oil pressure, or exceeding a predetermined throttle position (e.g., throttle level angle).

Figure 8:
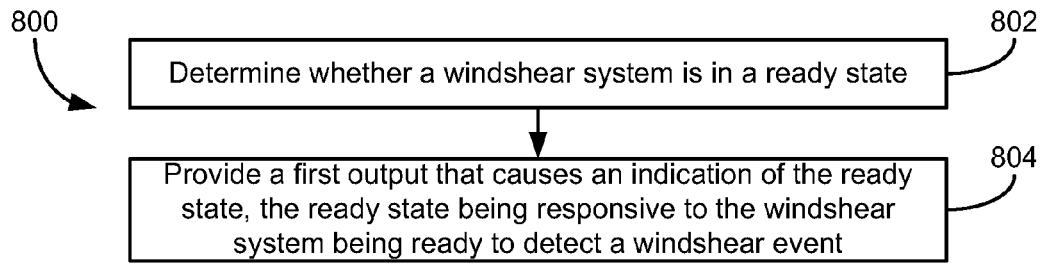
FIG. 8 is a schematic flow chart of a process for indicating readiness of a predictive windshear system on an aircraft, according to an exemplary embodiment.

Referring to FIG. 8, a flowchart of a process 800 for indicating readiness of a predictive windshear system on an aircraft is shown according to an exemplary embodiment. Process 800 is shown to include the steps of determining whether a windshear system is in a ready state (step 802). According to one embodiment, determining whether the windshear system is in a ready state may include comparing a time until an aircraft parameter (e.g., speed, altitude, etc.) reaches a predetermined value (e.g., V1, inhibit speed, 50 feet above ground level, etc.) with a time for the windshear system to complete initialization. According to another embodiment, the compared times may be predicted times. In response to a determination that the windshear system is ready to detect the windshear event, a first output that causes an indication of the ready state is provided (step 804). According to another embodiment, an output that causes an indication of the ready state may be provided in response to a determination that the windshear system is likely ready to detect windshear event or will likely be ready by the time a first parameter reaches a first value. According to various embodiments, indication of the ready state may include visual, aural, or haptic indications, or combinations thereof, in aircraft control center 310.

Figure 9:
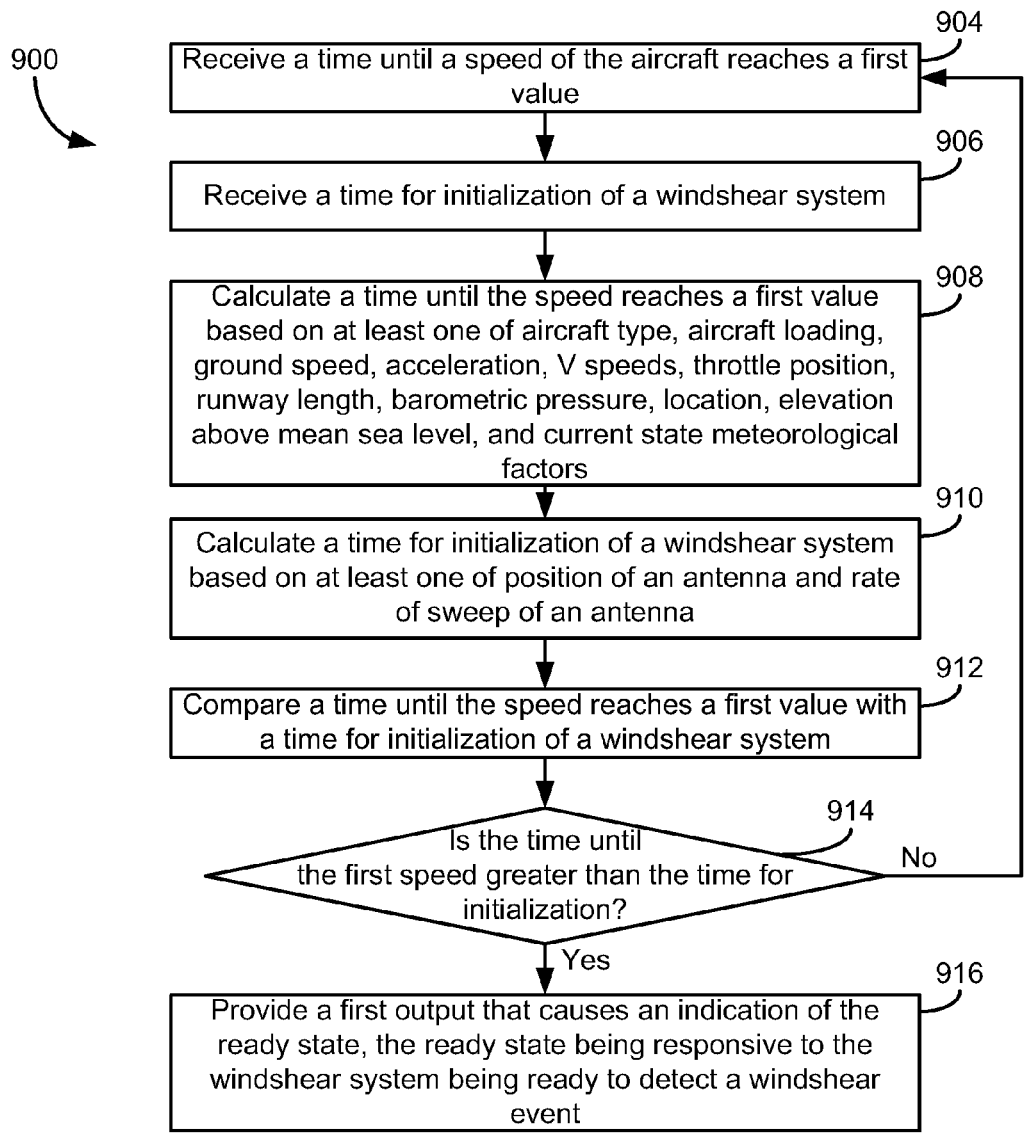
FIG. 9 is a schematic flow chart of a process for indicating readiness of a predictive windshear system on an aircraft, according to another exemplary embodiment.

Referring to FIG. 9, a flowchart of a process 900 for indicating readiness of a predictive windshear system on an aircraft is shown according to an exemplary embodiment. Process 900 is shown to include the steps of receiving a time until a speed of the aircraft reaches a first value (step 904). The first value may be V1, an inhibit speed after which no new alerts will be announced until the aircraft has taken off, or any other suitable speed. According to various embodiments, the first speed may be manually entered, stored in a memory, or stored in a database. According to another embodiment, process 900 may include receiving a first time until a parameter of the aircraft reaches a first value. The parameter may be an altitude or any other suitable parameter. In the case of an altitude, the first value may be a predetermined altitude above ground level or some altitude above sea level. Process 900 may include receiving a second time for initialization of a windshear system (step 906). For example, time for initialization of the windshear system may be provided by predictive windshear module 528 or weather radar system 400. According to various embodiments, the received times may be estimated times, predicted times, predetermined times, etc., or some combination thereof.

Process 900 is further shown to include calculating a time until the speed of aircraft 101 reaches a first value based on at least one of aircraft type, aircraft loading, ground speed, acceleration, V speeds, throttle position, runway length, barometric pressure, location, elevation above mean sea level, and current state meteorological factors (step 908). For example, a lightly loaded aircraft (for example, measured at the wheels) may attain the first speed (i.e., the speed of the first value) faster than a heavily loaded aircraft. Similarly, a small aircraft may attain the first speed sooner than a larger aircraft due to weight and/or drag factors. An aircraft with larger jet engines may reach the first speed faster than an aircraft with smaller jet engines or propeller engines. Similarly, a higher throttle position may cause an aircraft to reach the first speed sooner. If the aircraft has a higher ground speed (i.e., already moving) it may attain the first speed sooner. Higher barometric pressure (due to weather and/or lower altitude) and headwinds may affect the time until the first speed by increasing drag, but also increasing lift. A longer runway may increase V1, thereby increasing the time to reach V1. According to one embodiment, unique aircraft characteristics (e.g., V speeds, engine thrust, acceleration rates as a function of V speeds, throttle position, and/or loading, etc.) may be stored in a database and used in the calculation of the time until the speed reaches the first value. According to another embodiment, barometric pressure may be calculated from radio altitude above sea level, GPS altitude, a terrain database, etc. According to another embodiment, process 900 may include calculating a first time until a parameter of the aircraft reaches a first value. The parameter may be an altitude or any other suitable parameter. In the case of an altitude, the first value may be a predetermined altitude above ground level or some altitude above mean sea level.

Process 900 may also include the step of calculating a second time for initialization of a windshear system based on at least one of position of an antenna and rate of sweep of an antenna (step 910). According to various embodiments, the calculated times may be estimated times, predicted times, predetermined times, etc., or some combination thereof. The time until the first speed reaches the first value is compared to the predicted time to initialization of the windshear system (step 912). According to other embodiments, process 900 may include comparing a first time until a first parameter reaches a first value with a second time for initialization of the windshear system.

If the time to the first speed is greater than the time for initialization (step 914), a first output that causes an indication of the ready state is provided (step 916). According to various embodiments, indication of the ready state may include visual, aural, or haptic indications, or combinations thereof, in aircraft control center 310. According to various embodiments, the first output may cause an icon to appear on a display 320, may cause a display 320 to flash, may cause a lamp 340 to illuminate, and/or may cause an audio device 330 to produce a sound. The indication of likely readiness triggered by step 914 may be the same or different than the indication of likely readiness triggered by step 902. According to one embodiment, the sound is an aural, flight deck alert annunciation, for example, "Windshear system armed," or "Takeoff protected." According to the embodiment shown, if the predicted time to the first speed is not greater than the predicted time to initialization, then process 900 returns to step 904.

Various alternate embodiments to the process described are contemplated. Process 900 may not include all of the steps shown. According to another embodiment, process 900 may not include receiving the first and/or second times (steps 904 and 906). According to another embodiment, process 900 may not include calculating the first and/or second times (steps 908 and 910). According to yet other embodiments, process 900 may receive a time until a first speed (step 904) and calculate a time for initialization of the windshear system (step 910), or process 900 may receive a time for initialization (step 906) and calculate a time until the first speed (step 908). According to another embodiment, process 900 may not include steps 904-912, in which case process 900 may be a state machine. Process 900 may include additional steps. According to various embodiments, process 900 may receive a signal that the windshear system has initialized, or process 900 may calculate a predicted time to initialization of 0, at which times process 900 may provide an output to cause an indication of readiness and/or end process 900.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of indicating readiness of a predictive windshear system on an aircraft, the method comprising:
   determining whether the windshear system is in a ready state, comprising:
      comparing a first time until a first parameter reaches a first value with a second time for initialization of the windshear system; and
      determining that the windshear system is ready to detect the windshear event in response to the first time being greater than the second time; and
   providing a first output that causes an indication of the ready state, the ready state being responsive to the windshear system being ready to detect a windshear event.

2. The method of claim 1, wherein the first value is a maximum aircraft speed in a takeoff at which a pilot must take a first action to stop the aircraft within an accelerate-stop distance.

3. The method of claim 1 further comprising:
   receiving at least one of the first time and the second time.

4. The method of claim 1 further comprising:
   calculating at least one of the first time and the second time.

5. The method of claim 4, wherein the first time is calculated by processing electronics based on at least one of aircraft type, aircraft loading, ground speed, acceleration, V speeds, throttle position, runway length, barometric pressure, location, elevation above mean sea level, and current state meteorological factors.

6. The method of claim 4, wherein the second time is calculated by processing electronics based on at least one of position of an antenna and rate of sweep of an antenna.

7. The method of claim 1, wherein providing the first output causes at least one of the following to occur on the aircraft: an icon to appear on a display, a display or portion of a display to flash, a lamp to illuminate, and an audio device to produce a sound.

8. An apparatus for indicating readiness of a predictive windshear system on an aircraft, the apparatus comprising:
processing electronics configured to:
compare a predicted time until a first value with a predicted time until initialization of the windshear system;
determine that the windshear system is ready to detect a windshear event in response to the predicted time until the first value being greater than the predicted time until initialization; and
cause an indication of readiness to be output in response to a determination that the windshear system is ready to detect the windshear event.

9. The apparatus of claim 8, wherein the processing electronics are configured to receive at least one of the predicted time until the first value and the predicted time until initialization of the windshear system.

10. The apparatus of claim 8, wherein the processing electronics are configured to calculate at least one of the predicted time until the first value and the predicted time until initialization of the windshear system.

11. The apparatus of claim 10, wherein the predicted time until the first value is calculated based on at least one of aircraft type, aircraft loading, aircraft ground speed, aircraft acceleration, aircraft V speeds, throttle position, runway length, barometric pressure, location, elevation above mean sea level, and current state meteorological factors.

12. The apparatus of claim 10, wherein the predicted time until initialization is calculated based on at least one of position of an antenna and rate of sweep of an antenna.

13. The apparatus of claim 8, wherein the indication causes at least one of an icon to appear on a display in an aircraft control center, a display to flash in an aircraft control center, a lamp to illuminate in an aircraft control center, and an audio device to produce a sound in an aircraft control center.

14. A system for indicating readiness of a predictive windshear system on an aircraft, the system comprising:
means for comparing a predicted time until a first value with a predicted time until initialization of the windshear system;
means for determining that the windshear system is ready to detect the windshear event in response to the predicted time until the first value being greater than the predicted time until initialization; and
means for providing a first output that causes an indication of readiness in response to a determination that the windshear system is ready to detect the windshear event.

15. The system of claim 14 further comprising:
means for receiving at least one of the predicted time until a first value and the predicted time until initialization of the windshear system.

16. The system of claim 14 further comprising:
means for calculating at least one of the predicted time until a first value and the predicted time until initialization of the windshear system.

17. The system of claim 14 further comprising:
means for calculating the predicted time until a first value based on at least one of aircraft type, aircraft loading, ground speed, acceleration, V speeds, throttle position, runway length, barometric pressure, location, elevation above mean sea level, and current state meteorological factors.

18. The method of claim 1, wherein the first value is a predetermined altitude above ground level.

19. The apparatus of claim 8, wherein the first value is a maximum aircraft speed during a takeoff at which a pilot must take a first action to stop the aircraft within an accelerate-stop distance.

20. The system of claim 14 wherein the first value is a maximum aircraft speed during a takeoff at which a pilot must take a first action to stop the aircraft within an accelerate-stop distance.

* * * * *